(12) United States Patent
Magazinik et al.

(10) Patent No.: US 11,713,972 B2
(45) Date of Patent: *Aug. 1, 2023

(54) SYSTEM FOR NAVIGATING DRIVERS TO PASSENGERS BASED ON START TIMES OF EVENTS

(71) Applicant: Lyft, Inc., San Francisco, CA (US)

(72) Inventors: Igor Magazinik, Ramat Gan (IL); Ofer Samocha, Rishion le-Zion (IL)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,403

(22) Filed: Oct. 5, 2020

(65) Prior Publication Data

US 2021/0072035 A1 Mar. 11, 2021

Related U.S. Application Data

(63) Continuation of application No. 14/985,565, filed on Dec. 31, 2015, now Pat. No. 10,794,713.

(51) Int. Cl.
*G01C 21/34* (2006.01)
(52) U.S. Cl.
CPC .............................. *G01C 21/3438* (2013.01)
(58) Field of Classification Search
None
See application file for complete search history.

(56) References Cited

U.S. PATENT DOCUMENTS

| | | | |
|---|---|---|---|
| 7,663,528 B1 | 2/2010 | Malakian et al. | |
| 9,358,986 B2 | 6/2016 | Hunt | |
| 9,864,778 B1 * | 1/2018 | Strand | H04L 67/306 |
| 10,032,181 B1 | 7/2018 | Madhow et al. | |
| 10,157,436 B2 | 12/2018 | Samocha et al. | |
| 10,552,773 B1 | 2/2020 | Shah et al. | |
| 10,706,487 B1 | 7/2020 | Chachra et al. | |
| 10,794,713 B2 | 10/2020 | Magazinik et al. | |
| 11,035,683 B2 | 6/2021 | Marco | |
| 11,514,546 B2 | 11/2022 | Chachra et al. | |
| 2005/0015316 A1 | 1/2005 | Salluzzo | |
| 2005/0021225 A1 | 1/2005 | Kantarjiev et al. | |
| 2006/0069601 A1 | 3/2006 | Simon et al. | |
| 2008/0195428 A1 | 8/2008 | O'Sullivan | |
| 2009/0119006 A1 | 5/2009 | Silver et al. | |

(Continued)

FOREIGN PATENT DOCUMENTS

WO  WO 2020/159431 A1  8/2020

OTHER PUBLICATIONS

U.S. Appl. No. 16/177,085, Feb. 18, 2022, Office Action.

(Continued)

*Primary Examiner* — Navid Z. Mehdizadeh
(74) *Attorney, Agent, or Firm* — Keller Preece PLLC

(57) ABSTRACT

In one embodiment a transportation request specifying a pickup location is received. The transportation request is associated with an event to be attended by a subscriber to a transportation service. A start time of the event is determined. A data source associated with the event is monitored to detect whether the start time of the event has changed. A pickup time to pick up the subscriber for the event is determined wherein the pickup time is based at least in part on the start time of the event and the pickup location.

20 Claims, 6 Drawing Sheets

(56) References Cited

U.S. PATENT DOCUMENTS

| | | |
|---|---|---|
| 2009/0210262 A1 | 8/2009 | Clark et al. |
| 2009/0325556 A1 | 12/2009 | Lee et al. |
| 2010/0268450 A1 | 10/2010 | Stephen |
| 2011/0161116 A1 | 6/2011 | Peak et al. |
| 2011/0184640 A1 | 7/2011 | Coleman et al. |
| 2011/0246404 A1 | 10/2011 | Lehmann et al. |
| 2012/0246039 A1 | 9/2012 | Fain et al. |
| 2012/0316763 A1 | 12/2012 | Haynes, III et al. |
| 2013/0041708 A1 | 2/2013 | Jackson, Jr. et al. |
| 2013/0132140 A1 | 5/2013 | Amin et al. |
| 2013/0246207 A1 | 9/2013 | Novak et al. |
| 2013/0253969 A1 | 9/2013 | Das et al. |
| 2014/0129951 A1 | 5/2014 | Amin et al. |
| 2014/0156410 A1 | 6/2014 | Wuersch et al. |
| 2014/0172439 A1 | 6/2014 | Conway et al. |
| 2014/0207375 A1 | 7/2014 | Lerenc |
| 2014/0279654 A1 | 9/2014 | Lievens et al. |
| 2014/0337123 A1 | 11/2014 | Nuernberg et al. |
| 2014/0358435 A1 | 12/2014 | Bell et al. |
| 2015/0039214 A1 | 2/2015 | McClellan et al. |
| 2015/0046080 A1 | 2/2015 | Wesselius et al. |
| 2015/0081399 A1 | 3/2015 | Mitchell et al. |
| 2015/0154810 A1 | 6/2015 | Tew et al. |
| 2015/0161554 A1 | 6/2015 | Sweeney et al. |
| 2015/0161564 A1 | 6/2015 | Sweeney et al. |
| 2015/0206267 A1 | 7/2015 | Khanna et al. |
| 2015/0242772 A1 | 8/2015 | Backof, II et al. |
| 2015/0262430 A1 | 9/2015 | Farrelly et al. |
| 2015/0339928 A1 | 11/2015 | Ramanujam |
| 2015/0379437 A1 | 12/2015 | Reich |
| 2016/0026936 A1 | 1/2016 | Richardson et al. |
| 2016/0027307 A1 | 1/2016 | Abhyanker et al. |
| 2016/0034845 A1 | 2/2016 | Hiyama et al. |
| 2016/0098649 A1 | 4/2016 | Ifrach et al. |
| 2016/0117610 A1 | 4/2016 | Ikeda et al. |
| 2016/0148164 A1 | 5/2016 | Luk et al. |
| 2016/0171574 A1 | 6/2016 | Paulucci et al. |
| 2016/0171882 A1 | 6/2016 | Handley |
| 2016/0209220 A1 | 7/2016 | Laetz |
| 2016/0320198 A1 | 11/2016 | Liu et al. |
| 2016/0321566 A1 | 11/2016 | Liu et al. |
| 2017/0034110 A1 | 2/2017 | Bijor et al. |
| 2017/0102243 A1 | 4/2017 | Samocha et al. |
| 2017/0124506 A1 | 5/2017 | Khan |
| 2017/0154348 A1 | 6/2017 | Biswas et al. |
| 2017/0169377 A1 | 6/2017 | Liu et al. |
| 2017/0169535 A1 | 6/2017 | Tolkin et al. |
| 2017/0191842 A1 | 7/2017 | Igor et al. |
| 2017/0227370 A1 | 8/2017 | O'Mahony et al. |
| 2017/0262790 A1 | 9/2017 | Khasis |
| 2017/0353536 A1 | 12/2017 | Shraer et al. |
| 2017/0372235 A1 | 12/2017 | Dayama et al. |
| 2018/0025407 A1 | 1/2018 | Zhang et al. |
| 2018/0032928 A1 | 2/2018 | Li et al. |
| 2018/0075380 A1 | 3/2018 | Perl et al. |
| 2018/0101878 A1 | 4/2018 | Marueli et al. |
| 2018/0121847 A1 | 5/2018 | Zhao et al. |
| 2018/0121958 A1 | 5/2018 | Aist et al. |
| 2018/0158322 A1 | 6/2018 | McDonnell et al. |
| 2018/0174446 A1 | 6/2018 | Wang |
| 2018/0190040 A1 | 7/2018 | Batten et al. |
| 2018/0211541 A1 | 7/2018 | Rakah et al. |
| 2018/0225796 A1 | 8/2018 | Liu |
| 2018/0232840 A1 | 8/2018 | Liu |
| 2019/0066251 A1 | 2/2019 | Samocha et al. |
| 2019/0340928 A1 | 11/2019 | Goldman et al. |
| 2020/0082313 A1 | 3/2020 | Crapis et al. |
| 2020/0250600 A1 | 8/2020 | Gupta et al. |
| 2021/0192292 A1 | 6/2021 | Zhai |
| 2021/0192555 A1 | 6/2021 | Tang |

OTHER PUBLICATIONS

U.S. Appl. No. 16/780,712, Mar. 25, 2022, Office Action.
U.S. Appl. No. 16/921,698, Mar. 31, 2022, Office Action.
U.S. Appl. No. 16/177,085, Jul. 18, 2022, Office Action.
U.S. Appl. No. 16/780,712, Jun. 24, 2022, Notice of Allowance.
U.S. Appl. No. 16/921,698, Jul. 26, 2022, Notice of Allowance.
European Search Report for European Patent Application No. EP 17195933.6, dated Dec. 11, 2017, 9 pages.
Office Action as received in European Application 17195933.6 dated Oct. 18, 2019.
Summons to attend oral proceedings as received in European Application 17195933.6 dated Jun. 16, 2020.
Office Action as received in Israeli Application 254949 dated Sep. 24, 2019.
Office Action as received in Israeli Application 254949 dated Jul. 26, 2020.
U.S. Appl. No. 14/985,565, Aug. 29, 2017, Office Action.
U.S. Appl. No. 14/985,565, Feb. 21, 2018, Office Action.
U.S. Appl. No. 14/985,565, May 29, 2018, Office Action.
U.S. Appl. No. 14/985,565, Dec. 17, 2018, Office Action.
U.S. Appl. No. 14/985,565, Apr. 4, 2019, Office Action.
U.S. Appl. No. 14/985,565, Sep. 16, 2019, Office Action.
U.S. Appl. No. 14/985,565, Jun. 4, 2020, Notice of Allowance.
U.S. Appl. No. 15/290,366, Jun. 25, 2019, Office Action.
U.S. Appl. No. 15/290,366, Jan. 10, 2020, Office Action.
U.S. Appl. No. 15/290,366, May 13, 2020, Office Action.
U.S. Appl. No. 15/290,366, Oct. 27, 2020, Office Action.
U.S. Appl. No. 14/880,021, Jan. 13, 2017, Office Action.
U.S. Appl. No. 14/880,021, Jul. 11, 2017, Office Action.
U.S. Appl. No. 14/880,021, Dec. 5, 2017, Office Action.
U.S. Appl. No. 14/880,021, Apr. 17, 2018, Office Action.
U.S. Appl. No. 14/880,021, Aug. 23, 2018, Notice of Allowance.
U.S. Appl. No. 15/290,366, Mar. 22, 2021, Office Action.
U.S. Appl. No. 16/177,085, Nov. 5, 2020, Office Action.
U.S. Appl. No. 16/177,085, Mar. 25, 2021, Office Action.
U.S. Appl. No. 15/290,366, Jun. 29, 2021, Office Action.
Chawdhry, Amit, Uber: Users are more likely to pay surge pricing if their phone battery is low, May 25, 2016. Forbes.com https://www.forbes.conn/sites/annitchowdhry/2016/05/25/uber-low-battery/#732fbb8074b3 (Year: 2016).
U.S. Appl. No. 16/125,563, Nov. 30, 2018, Office Action.
U.S. Appl. No. 16/125,563, May 1, 2019, Office Action.
U.S. Appl. No. 16/125,563, Oct. 8, 2019, Notice of Allowance.
U.S. Appl. No. 16/125,551, Aug. 14, 2020, Office Action.
U.S. Appl. No. 16/125,527, Aug. 18, 2020, Office Action.
U.S. Appl. No. 16/125,540, Aug. 19, 2020, Office Action.
U.S. Appl. No. 15/810,028, Dec. 2, 2019, Office Action.
U.S. Appl. No. 15/810,028, Apr. 30, 2019, Notice of Allowance.
U.S. Appl. No. 16/539,965, Jun. 8, 2021, Office Action.
Lyft Help; "Personal Power Zones"; Date downloaded Jan. 12, 2022; https://help.lyft.com/hc/e/articles/115012926807-Personal-Power-Zones.
U.S. Appl. No. 16/539,965, Sep. 26, 2022, Office Action.
U.S. Appl. No. 16/177,085, Oct. 27, 2022, Notice of Allowance.
Ma, et al. "Spatio-temporal pricing for ridesharing platforms." Operations Research 70.2 (2022): 1025-1041. [online], [retrieved on Dec. 17, 2022]. Retrieved from the Internet <https://arxiv.orgiabs/1801.04015> (Year: 2018).
U.S. Appl. No. 16/944,428, dated Dec. 27, 2022, Office Action.
Alexander et al., Origin-destination trips by purpose and time of day inferred from mobile phone data, 2015, Elsevier, Transportation Research Part C 58, pp. 240-250 (Year: 2015).
U.S. Appl. No. 16/539,965, dated Apr. 21, 2023, Office Action.
U.S. Appl. No. 18/059,071, dated Mar. 30, 2023, Office Action.
U.S. Appl. No. 18/059,071, dated May 2, 2023, Notice of Allowance.

* cited by examiner

US 11,713,972 B2

SYSTEM FOR NAVIGATING DRIVERS TO PASSENGERS BASED ON START TIMES OF EVENTS

CROSS-REFERENCE TO RELATED APPLICATIONS

The present application is a continuation of U.S. application Ser. No. 14/985,565, filed on Dec. 31, 2015. The aforementioned application is hereby incorporated by reference in its entirety.

TECHNICAL FIELD

This disclosure relates in general to the field of mobile applications and, more particularly, to a system for navigating drivers to passengers based on start times of events.

BACKGROUND

A transportation service may utilize a plurality of drivers that fulfill passenger requests for transportation. A transportation service may provide one or more mobile applications that facilitate the efficient pairing of passengers and drivers. The transportation service may receive a transportation request and select a driver to fulfill the request based on information associated with the transportation request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment a transportation request specifying a pickup location is received. The transportation request is associated with an event to be attended by a subscriber to a transportation service. A start time is determined. A data source associated with the event is monitored to detect whether the start time of the event has changed. A pickup time to pick up the subscriber for the event is determined wherein the pickup time is based at least in part on the start time of the event and the pickup location.

Example Embodiments

Figure 1:
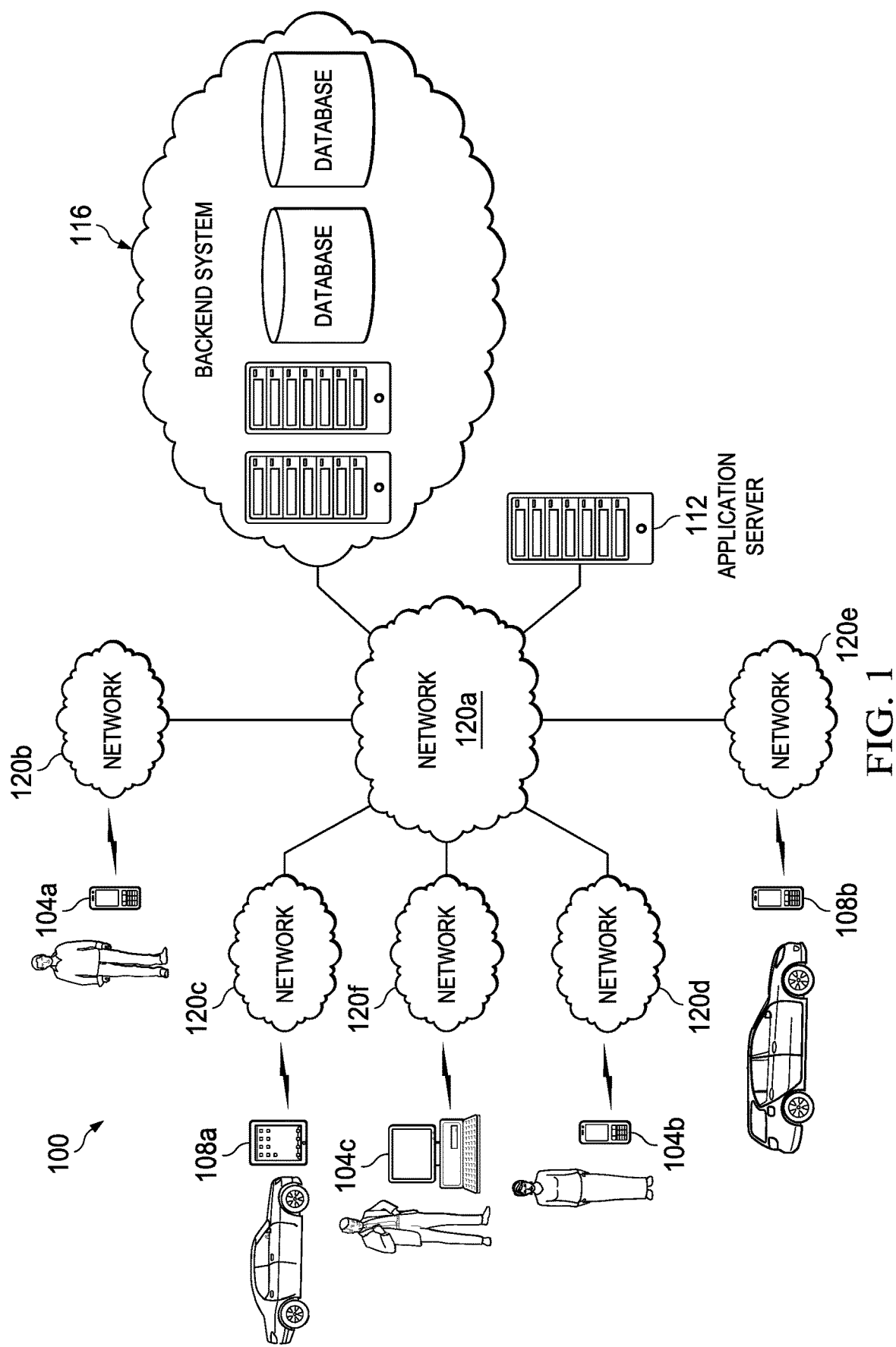
FIG. 1 illustrates a block diagram of a system for navigating drivers to passengers based on start times of events in accordance with certain embodiments.

FIG. 1 illustrates a block diagram of a system 100 for navigating drivers to passengers based on start times of events in accordance with certain embodiments. Although various embodiments may include any number of drivers, passengers, and associated devices, system 100 depicts three passengers having associated passenger computing devices 104 and two drivers having associated driver computing devices 108. The computing devices are coupled through various networks 120 to an application server 112 and a backend system 116.

Various embodiments of the present disclosure may enhance the experience of passengers and drivers associated with a transportation service by associating a transportation request from a passenger with an event and navigating a driver to the pick up the passenger at a time based on the start time of the event that will allow the passenger to arrive at the event on time. An event is any occurrence that may be associated with a start time and a location. Thus, an event could be a flight that is departing at a particular time, an indication (e.g., within a transportation request or calendar appointment or other device activity information) by a passenger that the passenger desires to arrive at a particular place by a particular time (e.g., the passenger may desire to arrive at work by 8:00 AM or his mother's house at 5:00 PM), a calendar appointment, a sporting event, or any other occurrence having a start time and location. Particular embodiments may include monitoring an information source associated with the event and adjusting the pickup time in response to a change in the start time of the event. In various embodiments, if the event is canceled, the transportation request may be canceled in response. Various embodiments may provide technical advantages such as optimizing the utilization of drivers thus reserving computing and power resources, minimizing the amount of interaction between the passenger and the passenger's computing device to order a ride specifying a desired pickup time, or other technical advantages.

Computing devices 104 and 108 may include any electronic computing device operable to receive, transmit, process, and store any appropriate data. In various embodiments, computing devices 104 and 108 may be mobile devices or stationary devices. As examples, mobile devices may include laptop computers, tablet computers, smartphones, personal digital assistants, smartwatches, computers integrated with a vehicle, computers integrated with clothing, and other devices capable of connecting (e.g., wirelessly) to one or more networks 120 while stationary devices may include desktop computers, televisions, or other devices that are not easily portable. Devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each computing device can include at least one graphical display and user interface allowing a user to view and interact with applications and other programs of the computing device. In a particular embodiment, computing device 108 may be a hardened device that is configured to only run a driver application using a specialized operating system (e.g., a modified version of Android). In one embodiment, a transportation service may issue or otherwise facilitate the provision of hardened devices to its drivers, but restrict the functionality of the devices to the driver application (i.e., the devices may be locked down so as not to allow the installation of additional applications or may only allow preapproved applications to be installed).

In various embodiments, a driver computing device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations driver destination locations, navigational directions, etc.) to the self-driven vehicle. Accordingly, as used herein "driver" may refer to a human being that may physically drive or otherwise control movement of a vehicle or to the vehicle itself (e.g., in the case of a self-driven vehicle) or component thereof (e.g., computing device application 108 or logic thereof).

In particular embodiments, a passenger application runs on passenger computing devices 104. The application may allow a user to enter various account information (e.g., in connection with a registration with the transportation service) to be utilized by a transportation service. For example, the account information may include a user name and password (or other login credentials), contact information of the user (e.g., phone number, home address), payment information (e.g., credit card numbers or bank account numbers and associated information), car preference information (e.g., what models or color of car the user prefers), or other account information.

The application may allow a user to request a ride from the transportation service. In various embodiments, the application may establish a pick-up location automatically or based on user input (e.g., locations may include the current location of the computing device 104 as determined by a global positioning system (GPS) of the computing device or a different user specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger computing device 104. Any suitable information about the potential driver(s) may be sent to the computing device 104 either before or after the selection of the driver by the passenger, such as a location of a driver, an estimated pick-up time, a type of car used by a driver, the merchandise available in the car, driver ratings or comments from other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the computing device 104 and the route to be taken. Upon completion of the ride, the application may provide the passenger the ability to rate the driver or provide comments about the driver.

In particular embodiments, a driver application runs on driver computing devices 108. The application may allow a driver to enter various account information to be utilized by a transportation service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the transportation service. In some embodiments, the driver may select between multiple levels of availability. In one example, the driver may be "available," meaning that the driver is willing to receive and consider any transportation requests that the transportation service sends the driver; the driver may be "unavailable," meaning that the driver is not willing to receive any transportation requests (e.g., this state may be explicitly indicated by the driver inputting this state into his computing device or may be detected through a deduction that the driver's computing device is not logged in to the transportation service through the driver application), or the driver may be "inactive," meaning that the driver only desires to receive particular requests meeting certain exception criteria specified by the driver.

The application may periodically transmit the current location of the computing device 108 as determined by a GPS of the computing device 108 to the backend system 116. When a driver is selected to provide (or is identified as a suitable candidate for) a ride, backend system 116 may send a notification to the driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed by backend system 116, the application may navigate the driver to the passenger. The application may also provide contact information for the passenger and/or the ability to contact the passenger through the application (e.g., via a phone call, email, instant message, or text). The application may also navigate the driver to the passenger's destination once the ride begins. Upon completion of the ride, the application may provide the driver the ability to rate the passenger or provide comments about the passenger.

System 100 may include one or more application servers 112 coupled to the computing devices through one or more networks 120. The passenger application and driver application may be supported with, downloaded from, served by, or otherwise provided through an application server 112 or other suitable means. In some instances, the applications can be downloaded from an application storefront onto a particular computing device using storefronts such as Google Android Market, Apple App Store, Palm Software Store and App Catalog, RIM App World, etc., or other sources. In various embodiments, the passenger application and driver application may be installed on their respective devices in any suitable manner and at any suitable time. As one example, a passenger application may be installed on a computing device as part of a suite of applications that are pre-installed prior to provision of the computing device to a consumer. As another example, a driver application may be installed on a computing device by a transportation service (or an entity that provisions computing devices for the transportation service) prior to the issuance of the device to a driver that is employed or otherwise associated with the transportation service.

As described above, applications utilized by computing devices 104 and 108 can make use of a backend system 116. Backend system 116 may comprise any suitable servers or other computing devices that facilitate the provision of a transportation service as described herein. For example, backend system 116 may receive a request from a passenger and facilitate the assignment of a driver to fulfill the request. Backend system 116 is described in more detail in connection with FIG. 3.

In general, servers and other computing devices of backend system 116 or application server 112 may include electronic computing devices operable to receive, transmit, process, store, or manage data and information associated with system 100. As used in this document, the term "computing device," is intended to encompass any suitable processing device. For example, portions of backend system 116 or application server 112 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including transportation service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the computing devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
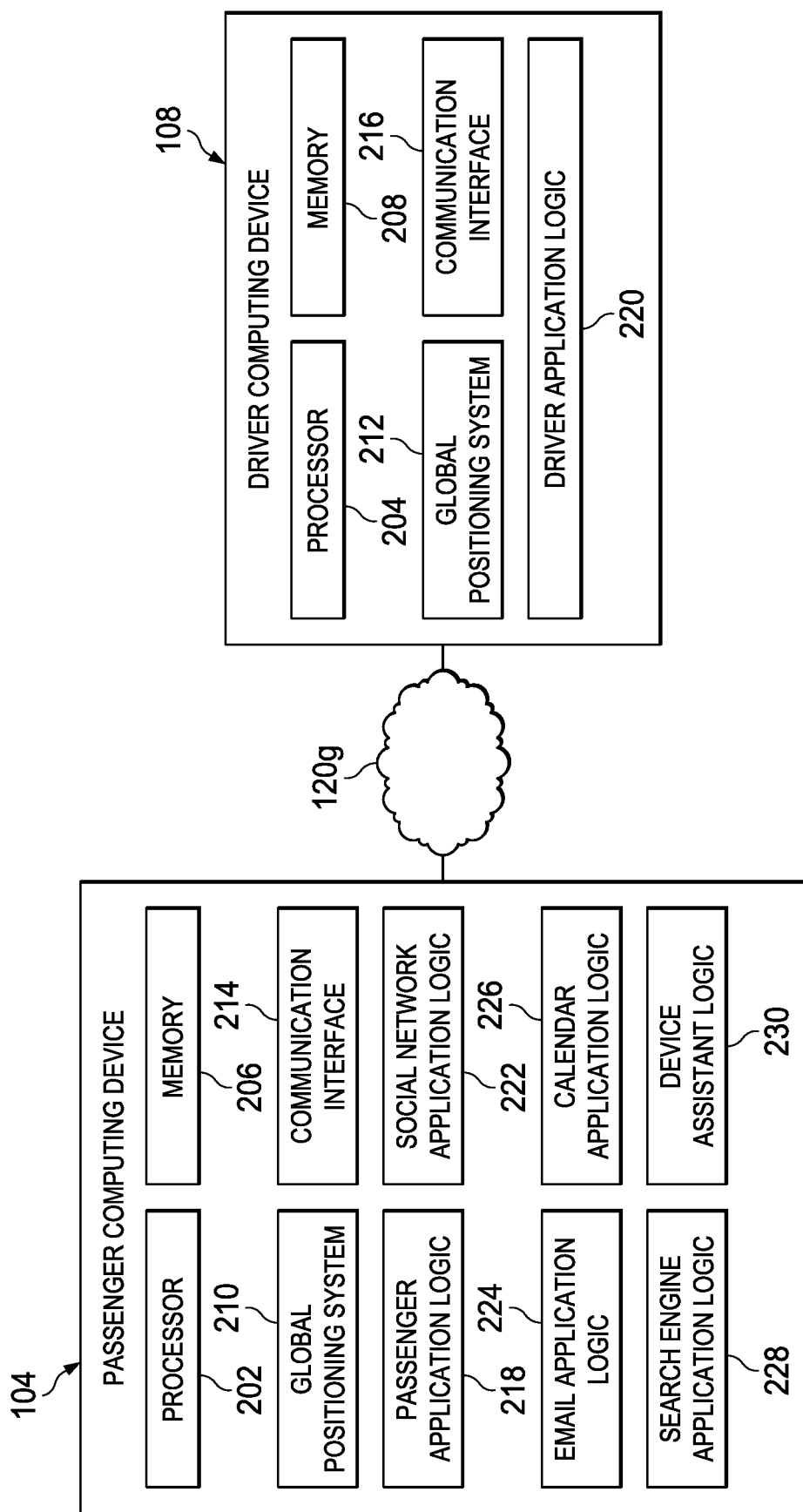
FIG. 2 illustrates a block diagram of a passenger computing device and a driver computing device of the system of FIG. 1 in accordance with certain embodiments.

FIG. 2 illustrates a block diagram of a passenger computing device 104 and a driver computing device 108 of the system of FIG. 1 in accordance with certain embodiments. Herein, "passenger computing device" may be used to refer to a computing device used by a subscriber or other user who interacts with the transportation service (e.g., by communicating with the transportation service to request transportation) while "driver computing device" may be used to refer to a computing device used by a driver of the transportation service. A subscriber may refer to an individual or entity that has provided account data (e.g., user name, password, payment information, telephone number, home address, other account information, or any suitable combination thereof) to backend system 116 for storage by the backend system 116. In the embodiment shown, the devices may be communicatively coupled through network 120g which may include any suitable intermediary nodes, such as a backend system 116.

In the embodiment depicted, computing devices 104 and 108 each include a computer system to facilitate performance of their respective operations. In particular embodiments, a computer system may include a processor, storage, and one or more communication interfaces, among other components. As an example, computing devices 104 and 108 each include one or more processors 202 and 204, memory elements 206 and 208, and communication interfaces 214 and 216, among other hardware and software. These components may work together in order to provide functionality described herein.

A processors 202 or 204 may be a microprocessor, controller, or any other suitable computing device, resource, or combination of hardware, stored software and/or encoded logic operable to provide, either alone or in conjunction with other components of computing devices 104 and 108, the functionality of these computing devices. In particular embodiments, computing devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an application specific integrated circuit (ASIC) that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by computing devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between computing devices 104 and 108 and one or more networks (e.g., 120g) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. In various embodiments, any of the data described herein as being communicated between elements of system 100 may be data generated using voice commands from a user or data generated independently of voice commands (e.g., data may be generated by a processor in response to the processor receiving data from another element or from an input device such as a touch screen). Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective computing devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Passenger application logic 218 may include logic providing, at least in part, the functionality of the passenger application described herein. Similarly, driver application logic 220 may include logic providing, at least in part, the functionality of the driver application described herein. In a particular embodiment, the logic of devices 104 and 108 may include software that is executed by processor 202 and 204. However, "logic" as used in this Specification, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In a particular embodiment, a user may supply login credentials for a social network system (e.g., FACEBOOK) or other social media system (e.g., TWITTER) to the transportation service through passenger application logic 218. The transportation service (e.g., through backend server) may then access the user's account on the social network system or other social media system and access information associated with the user's account. As another example, passenger application logic 218 may access the user's social media account directly and integrate information from the account with other functionality of the passenger application logic.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In various embodiments, the social network system may interact with passenger application logic 218 or backend system 116 to enhance the functionality of these components. As an example, background information associated with a passenger may be obtained by a backend system 116 and used to determine whether to route a request from the passenger to a particular driver.

In a particular embodiment, the social network system allows users to create events, invite others to events, and to indicate attendance at such events. A record for an event stored by the social network system may include any suitable information, such as the name of the event, the type of event, the time and date of the event, the location of the event, a record of users that were invited to the event as well as an indication of whether the users have accepted, declined, or not yet responded to the invitation, or other suitable information about the event.

In various embodiments, the social network system may interact with passenger application logic 218 or backend server 302 to enhance the functionality of these components. As an example, events created in the social network system may be provided to the backend server 302 through an API or other interface to a data store of the social network system. In one embodiment, the social network system may allow backend server 302 to access events independent of a user login associated with a passenger or driver. For example, the social network system may have an arrangement with the taxi service to provide events created in the social network system to the taxi service. In another embodiment, backend server 302 may access the events visible by the taxi service's administrators, passengers, and/or drivers via their respective login credentials to the social network system.

In various embodiments, the social network system may provide any of the functionality listed above with respect to passenger application logic 218 in allowing a user to request a ride from an event and may relay received requests for rides to backend server 302 along with any suitable identifying information about the user to facilitate pickup by a driver. In one embodiment, information associated with requesting a ride from the event may be provided on an event page (e.g., a page that displays the details of the event) viewed by the user using social network application logic 222, a network browser, or other means. The information associated with requesting a ride may include instructions to or an interface (e.g., a link) to request a ride through the social network system, instructions to or a link to download passenger application logic 218 in order to request a ride, an advertisement about the taxi service along with an indication that the taxi service may provide a ride from the event, a coupon for a discounted ride from the event, or other suitable information facilitating the request of a ride from a user (who may or may not already be a customer of the taxi service). In another embodiment, information associated with requesting a ride may be sent to the user by the social network system through the social network application logic 222 (e.g., via a push notification) or other means (e.g., email, text messaging). In various embodiments, the information associated with requesting a ride from the event is provided to the user in response to a determination that the user is at the event.

Email application logic 224 may provide an interface for the passenger to read, draft, and/or manage emails. Email application logic 224 may comprise a traditional email client (e.g., Microsoft Outlook or a native iOS or Android mail application) or a web-based email application (e.g., a web browser or other application operable to access Outlook.com, Gmail, Yahoo! Mail, or other web-based email service).

Calendar application logic 226 may provide an interface for the passenger to read, draft, and/or manage calendar appointments and related tasks. Calendar application logic 226 may comprise a traditional calendar client (e.g., Microsoft Outlook or a native iOS or Android calendar application) or a web-based calendar application (e.g., a web browser or other application operable to access Outlook.com, Google Calendar, or other web-based calendar service).

Search engine application logic 228 may provide an interface for the passenger to perform Internet keyword searches. In various embodiments, logic 228 is operable to receive input forming a keyword search. In some embodiments, logic 228 may also perform the keyword search by transmitting the search to one or more servers operable to perform the search and provide search results back to logic 228. In other embodiments, logic 228 may communicate the input to another application to perform the keyword search. In various embodiments, logic 228 may present the search results to the passenger via any suitable interface (e.g., a visual or audio interface). In various embodiments, logic 228 may comprise a web browser or other application.

Device assistant logic 230 may comprise logic to enhance the functionality of other applications of passenger computing device 104. In particular embodiments, device assistant logic 230 may comprise an intelligent personal assistant, such as Siri, Cortana, Google Now, or similar assistant. In various embodiment, device assistant logic 230 may monitor activity of the passenger computing device 104, including an operating system or one or more applications of passenger computing device 104. For example, device assistant logic 230 may access emails, instant messages, or text messages sent by, received by, or accessible by email application logic 224 or other logic of passenger computing device 104. As another example, device assistant logic 224 may access calendar appointments available through calendar application logic 226 (which may be stored in a calendar file stored by passenger computing device 104 or on a remote server). As another example, device assistant logic 224 may access search queries made through search engine application logic 228. As another example, device assistant logic 224 may access transportation requests made through passenger application logic 218 or detect when passenger application logic 218 is opened. As another example, device assistant logic 230 may access the location of passenger computing device 104 using data determined by global positioning system 210.

In various embodiments, device assistant logic 230 may enhance the user experience of the passenger by answering questions from the passenger, making recommendations to the passenger, and performing other actions, such as drafting emails, texts, or calendar appointments. In addition to answering questions explicitly asked by the passenger, device assistant logic 230 may proactively obtain information and present the information to the passenger. In various embodiments, the proactive presentation of information is based upon previous user activity with respect to passenger computing device 104. For example, device assistant logic 230 may present or direct the presentation of (e.g., within a web browser) the status of a flight reservation or other travel reservation that the passenger booked or accessed using a web browser of the passenger computing device 104 or for which a confirmation email was received via email application logic 224. As other examples, device assistant logic 230 may direct the presentation of hotel or restaurant reservations, weather information, sporting event information, package tracking information, local movie times, stock prices, news events, or other information based on the passenger's location, emails, calendar appointments, search or browsing history, or other activity.

Device assistant logic 230 may also use information obtained from the operating system or applications of passenger computing device 104 to enhance the user experience of the passenger with respect to the transportation service. For example, information obtained by the device assistant logic 230 may be used to identify events that the passenger may be attending. In various embodiments, device assistant logic 230 may communicate device activity information (which may include at least a subset of the gathered information or other information obtained by processing at least a subset of the gathered information) directly to a server of backend system 11 6 controlled by the transportation service. In other embodiments, device assistant logic 230 may communicate activity information to a third party server controlled by, for example, the provider of the device assistant logic (e.g., Google, Apple, Microsoft, etc.), which may then communicate the device activity information (or a subset thereof) to a server of backend system 116 controlled by the transportation service. In yet other embodiments, device assistant logic 230 may communicate device activity information with passenger application logic 218 which may then communicate device activity information (or a subset thereof) to the backend system 116.

Figure 3:
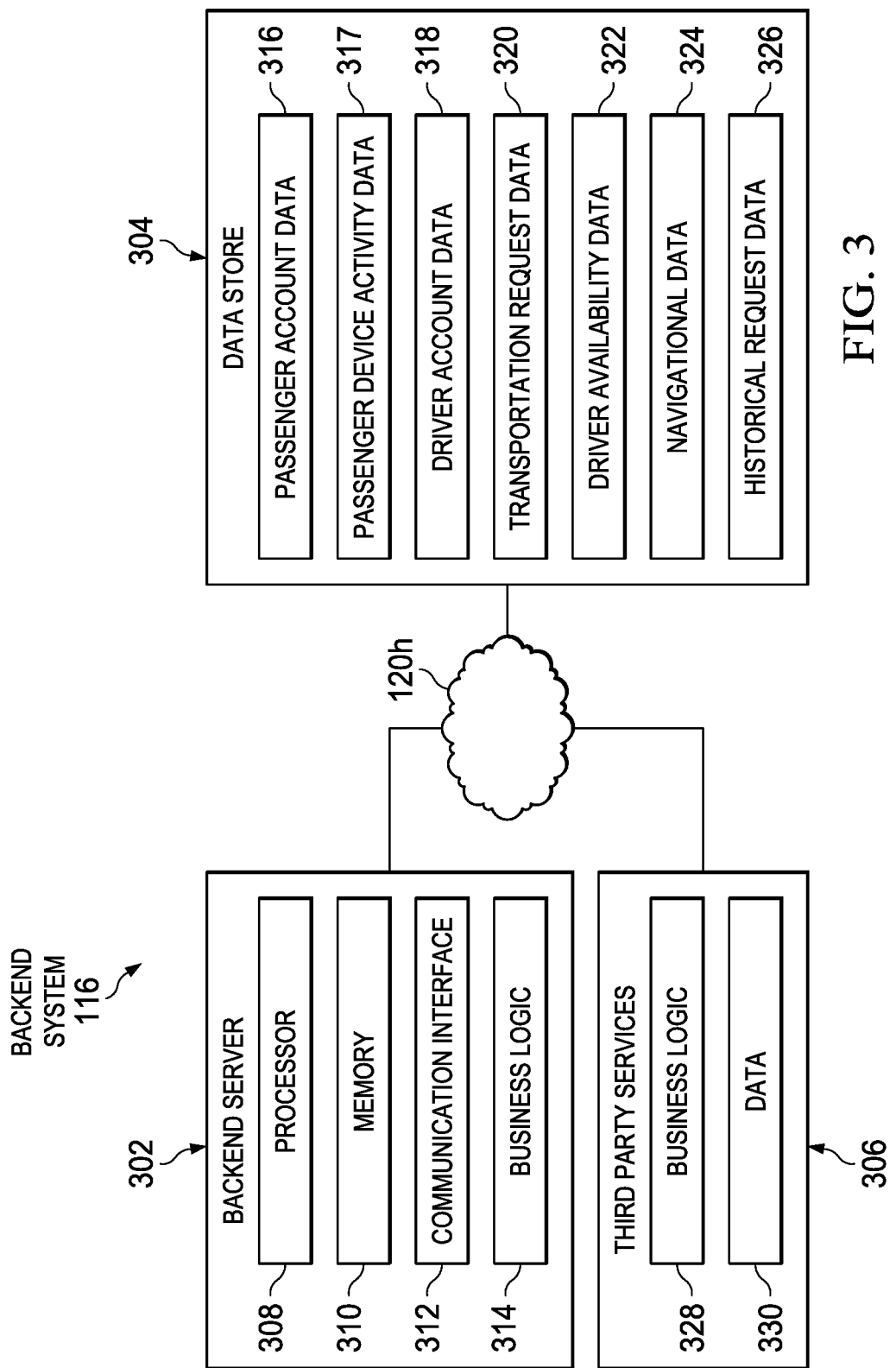
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the transportation service described herein. In the embodiment depicted, backend system includes backend server 302, data store 304, and third party services 306 coupled together by network 120h. In various embodiments, backend server 302, data store 304, and/or third party services 306 may each comprise one or more physical devices (e.g., servers or other computing devices) providing the functionality described herein. In some embodiments, one or more of backend server 302, data store 304, and third party services 306 (or portions thereof) are deployed using a cloud service and may comprise one or more virtual machines or containers. In a particular embodiment, backend server 302 and data store 304 are controlled by the transportation service, while third party services 306 are controlled by a third party entity.

In the embodiment depicted, backend server 302 includes a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together. Backend server 302 may include one or more discrete devices.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., computing devices 104 and 108, data store 304, third party services 306, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the transportation service. Data store 304, may store any suitable data associated with the transportation service in any suitable format(s). For example, data store 304 may include one or more database management systems (DBMS), such as SQL Server, Oracle, Sybase, IBM DB2, or NoSQL data bases (e.g., Redis and MongoDB). Data store 304 may be located on one or more computing devices that are distinct from backend server 302 or on the same device as at least a portion of backend server 302. Any of the information stored by data store 304 could additionally or alternatively be stored locally in memory 310 temporarily or persistently.

In the embodiment depicted, data store 304 includes passenger account data 316, passenger device activity data 317, driver account data 318, transportation request data 320, driver availability data 322, navigational data 324, and historical request data 326. The various data may be updated at any suitable intervals.

Passenger account data 316 may include any suitable information associated with accounts of subscribers to the transportation service, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Passenger device activity data 317 may comprise device activity information received from passenger computing devices 104 (e.g., via passenger application logic 218, device assistant logic 230, or from a third party service), such as Internet search queries or local search queries (e.g., searches run within applications of passenger computing device 104 for files or other data), web browsing history, calendar appointments, emails, text messages, instant messages, location data (e.g., from GPS 210 of the device), other activity information, and/or information derived therefrom. In various embodiments, device activity information may be used (e.g., by the passenger application or the backend system 116) to identify one or more events the user plans to attend. Any suitable event may be identified based on the device activity information, such as a flight departure or arrival, a train departure or arrival, another type of transportation event, a business or other meeting, a calendar appointment, a concert, a doctor's appointment, an appointment with a civic office (such as a department of motor vehicles), a sporting event, a social event (e.g., the passenger may need to be at a friend's house by a specific time), or other suitable event.

For any suitable identified events, passenger device activity data 317 may also comprise indications of whether a particular event resulted in the generation of a transportation request and if so, the particular details of the transportation request or a link to the transportation request in historical request data 326 (to be explained in further detail below). In various embodiments, passenger device activity data 317 may also comprise statistics correlating particular events with transportation requests made by the passengers. For example, passenger device activity data 317 may include statistics indicating how likely one or more particular types of events are to result in the generation of a transportation request by the passenger.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of transportation requests (whereby the backend server 302 may assign a transportation request to the driver without waiting for the driver to indicate acceptance of a request), or other suitable information.

Transportation request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the expected arrival time at the destination location, the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

In particular embodiments, transportation request data 320 may also store information regarding events that are associated with particular transportation requests. For example, if a particular transportation request has been associated with a particular event, the entry for the transportation request may indicate this association as well as information regarding the event (or a link to such information), such as a location of the event, a scheduled start time of the event, an event information source associated with the event (e.g., a web address or other identifier of an information source from which current information about the event may be obtained). An entry for a transportation request may also include a scheduled pickup time for the driver to pick up the passenger, a scheduled route that the driver is to take to transport the passenger from the pickup location to the location of the event, an estimated length of time it will take to travel the route, or other suitable information. In various embodiments, these parameters may be updated in response to a change of one or more parameters, such as the start time of the event, the pickup location, or traffic conditions.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of transportation requests, or other suitable information. In particular embodiments, driver availability data 322 may include information indicating whether a driver is travelling towards a location selected based on one or more prospective passengers (e.g., in anticipation of receiving a transportation request from one of the passengers).

Navigational data 324 may comprise information supporting navigation functions provided by the passenger applications and driver passenger applications. For example, navigational data 324 may comprise map data that may be sent to passenger computing devices 104 and driver computing devices 108 to allow the devices to display maps and associated indicators (e.g., location of passenger(s), location of driver(s), desired routes, etc.). In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the transportation request data 320 as well as any combination of additional data such as the time at which the destination location was reached, the total time of the trip, the total fare, a rating given by the passenger to the driver or by the driver to the passenger for the trip, or other suitable information associated with the trip.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). In particular embodiments, a third party service 306 may communicate with device assistant logic 230 of various passenger computing devices to receive device activity information and send information to the passenger computing devices 104 to provide information enabling the functionality of device assistant logic 230. In some embodiments, the activity information may be transmitted by the third party service 306 to backend server 302. In various embodiments, the device activity information may be filtered by the third party service 306 before transmission to the backend server 302. For example, third party service 306 may filter out non-relevant information or information that is restricted from being sent by one or more privacy setting preferences of the passenger. Third party service 306 may also process the activity information on the transportation service's behalf before transmitting the processed information to the backend server. For example, third party service 306 might aggregate activity information to determine one or more events associated with the passenger (e.g., a flight or a meeting) and send information associated with the event to backend server 302. Business logic 328 may comprise any suitable logic operable to receive requests for data from backend system 116 and/or computing devices 104 and 108 and provide responses to the requests.

Backend server 302 may be in communication with each passenger computing device 104 and each driver computing device 108 that is utilizing the transportation service at a particular time. Backend server may store information received from the computing devices 104 and 108 in data store 304. Backend server 302 may also receive and respond to requests made by computing devices 104 and 108 by processing information retrieved from data store 304.

When a passenger opens the passenger application, the backend server 302 may log the passenger in based on a comparison of authentication information provided by the passenger computing device 104 with authentication information stored in passenger account data 316. The passenger may then request a ride. The request is received by the backend server 302 and stored in transportation request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his computing device 108. If the driver rejects the request, backend server 302 selects a different driver and the process is repeated until the backend server 302 receives an accepted request from a driver. In another embodiment, backend server 302 may select a plurality of drivers that may fulfill a transportation request and allow the passenger to select one of the drivers. The backend server 302 may proceed to notify the driver of the request in a similar manner to that described above. In yet another embodiment, backend server 302 may select a plurality of drivers that may fulfill a transportation request and notify each driver of the transportation request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the transportation request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information (e.g., the passenger's current location or other pickup location and directions to the current location or other pickup location) to the driver computing device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

In various embodiments, backend server 302 may receiving a transportation request from a subscriber and associate an event with the transportation request. The backend server 302 may determine to associate a transportation request with an event in any suitable manner.

For example, a transportation request may be associated with an event when the transportation request that explicitly identifies an event is received. For example, the transportation request may be linked to a calendar appointment of the passenger. As another example, the transportation request may identify an event on a social networking site (as one example, the transportation request may be generated from an event page of the social networking site). As another example, an event may be selected from a plurality of events available for display by passenger application logic 218 (e.g., in a list or stored in a searchable database). As another example, passenger application logic 218 may use information from a transportation request entered by a user to identify an event and append the event to the transportation request before sending the request to backend server 302. In various embodiments, the event may comprise a combination of the destination location and a necessary arrival time specified by the passenger within the transportation request (e.g., using passenger application logic 218).

As another example, a transportation request may be associated with an event when the transportation request or device activity information of the passenger computing device 104 includes information that the backend server is able to correlate with an event. For example, the backend server may compare any suitable combination of details specified in a transportation request, such as a destination location and a pickup time (from which an estimated arrival time may be calculated), against parameters of a known event (e.g., location and start time) to check whether the transportation request corresponds to the event. As another example, the event may be identified from the device activity information in any suitable manner. For example, details associated with the event may be explicitly specified in the device activity information (e.g., the start time and location of an event may be specified in a calendar appointment). As another example, particular details associated with the event (e.g., the name of the event or a location of the event) may be specified in the device activity information and an event information source may be consulted for additional information about the event (e.g., the start time of the event).

In various embodiments, backend server 302 may connect to event information sources through one or more networks. An event information source may include any source containing information about an event. For example, an event information source may be a server hosting a webpage containing event information, a server providing an API through which backend server 302 may request event information from the server, a server providing access to a file (e.g., a calendar file such as an iCalendar or vCalendar file) containing information about one or more events, a computing device which may be used by an administrator to manually enter event information, information obtained from a passenger or driver computing device, or other suitable source. In an embodiment, an event information source includes a social network system. In some embodiments, event information may be uploaded directly to backend server 302 via a flash drive or other means. In one embodiment, backend server 302 may access various websites and parse the data included in the websites to obtain the event information. The event information obtained from one or more event information sources may include any suitable information about an event, such as a title of the event, a location of the event, a type of the event, a start time of the event, or other information associated with the event which may be compared against parameters in the transportation request or device activity information.

In particular embodiments, in situations in which an event is identified based on information in the transportation request or device activity information, the backend server 302 may send a message to the passenger computing device 104 asking the passenger to confirm that the event should be associated with the transportation request and only associate the event with the transportation request when an affirmative answer is received.

In various embodiments, backend server 302 may process transportation requests that are associated with events in a manner that is different from the way it processes standard transportation request. For example, backend server 302 may determine a pickup time for the transportation request that is calculated to allow the passenger to arrive at the destination location at or prior to the start time of the event (and may adjust this pickup time if conditions change). Backend server 302 may also monitor the status or start time of the event and notify the passenger (e.g., via passenger computing device 104) if there is a change in status (e.g., if the event is canceled) or start time. Backend server 302 may also cancel the transportation request if the event is canceled. In various embodiments, backend server 302 may first inquire of the passenger whether the passenger desires such functionality before processing the transportation requests in any of these manners.

In particular embodiments, backend server 302 may determine a pickup time for the transportation request that is calculated to allow the passenger to arrive at the destination location at or prior to the start time of the event. Such a determination may include determining a desired arrival time for the passenger to arrive at the event, a location of the event, and a pickup location. An estimated travel time may be determined based on the pickup location and the location of the event and one or more other suitable factors, such as the current and/or estimated traffic between the pickup location and the location of the event. In various embodiments, one or more routes between the pickup location and the location of the event are identified and an estimated time to travel each route at the relevant time is calculated and the travel time of the best route is used as the estimated travel time. The estimated travel time may be subtracted from the desired arrival time to determine the pickup time.

In various embodiments, the desired arrival time is based on the event's start time. For example, the desired arrival time may be set to the event's start time. As another example, the desired arrival time may be set to the event's start time minus an amount of time that may be viewed as a buffer. In some embodiments, the buffer may be specified by the passenger using the passenger application logic 218. In other embodiments, the buffer may be determined by the backend server 302.

In particular embodiments, backend server 302 may monitor one or more parameters of the transportation request or the event and update the pickup time when relevant parameters change. For example, backend server 302 may monitor an event information source associated with the event to detect whether the start time of the event has changed or the event has been canceled. In particular embodiments, backend server 302 may periodically query the event information source as to whether the start time of the event has changed or the event has been canceled. In other embodiments, backend server 302 may be notified by an event information source when the start time changes or the event is canceled. If it is determined that the start time of the event has changed, the pickup time may be updated to take into account the changed start time.

In various embodiments, if it is determined that the pickup location has changed, the pickup time is updated to take into account the changed pickup location. The change of the pickup location may be based on passenger input or passenger movement. For example, the passenger may have specified a location (e.g., an address) initially and may change the specified location after the transportation request has been submitted to the backend server 302. As another example, the passenger may have specified the pickup location as the location of the passenger computing device and the passenger may change locations in between the submission of the transportation request and the calculated pickup time. The estimated travel time may be recalculated based on the new location of the passenger's computing device and the pickup time may be adjusted accordingly. The location of the passenger computing device may be monitored at any suitable interval.

In various embodiments, the travel time may be recalculated at periodic intervals and if the travel time has changed because of a difference between the expected and actual traffic, the pickup time may be updated accordingly.

In various embodiments, backend server 302 notifies the passenger (e.g., via passenger application logic 218 or other logic of passenger computing device 104) when the pickup time changes. In particular embodiments, the passenger is not notified unless the pickup time has changed by a value exceeding a predetermined threshold. In response to a determination that the event has been canceled, the passenger may be notified of the cancelation. The notification may be withheld if the cancelation of the event was initiated by the passenger. In response to the determination that the event has been canceled, the transportation request may be canceled by the backend server 302.

In particular embodiments, backend server 302 may proactively identify an event that may be attended by the passenger based on device activity information (e.g., independent of a transportation request submitted by the passenger). The backend server may base the determination of whether the passenger is likely attending an event on any suitable device activity information, such as a calendar file comprising one or more appointments of the passenger, one or more emails sent to or composed by the passenger, one or more previous transportation requests made by the passenger, web browser activity, one or more search queries made through a search engine by the passenger, historical location data of the passenger's computing device 104, other device activity information described herein, or other suitable device activity information.

In some embodiments, in response to determining that a passenger is likely to attend the event, a message may be sent by backend server 302 (or other computing system of backend system 116) to the passenger's computing device 104. The message may be sent to any suitable logic, such as passenger application logic 218, email application logic 224, or other logic of passenger computing device 104 for presentation to the passenger. The message may include any suitable indication to encourage or assist the passenger to submit a transportation request in connection with the event. For example, the message may include information about the event, an estimated pickup time, an estimated time of arrival at the location of the event, a discounted fare offer, a query as to whether the passenger desires a ride, or other suitable information. In particular embodiments, the message may include reply options that allow the passenger to submit a transportation request (from within or outside of the passenger application) or indicate that the passenger does not desire a transportation request.

In various embodiments, backend system 302 may reserve a driver to fulfill a transportation request associated with an event and temporarily limit the transportation requests that the driver is offered to requests that may be fulfilled by the driver while still allowing the driver to fulfill the transportation request associated with the event. In one embodiment, in response to a change in the pickup time of the transportation request, a driver who was previously selected to fulfill the transportation request may be released from fulfilling the transportation request and a different driver may be selected to fulfill the transportation request.

Figure 4:
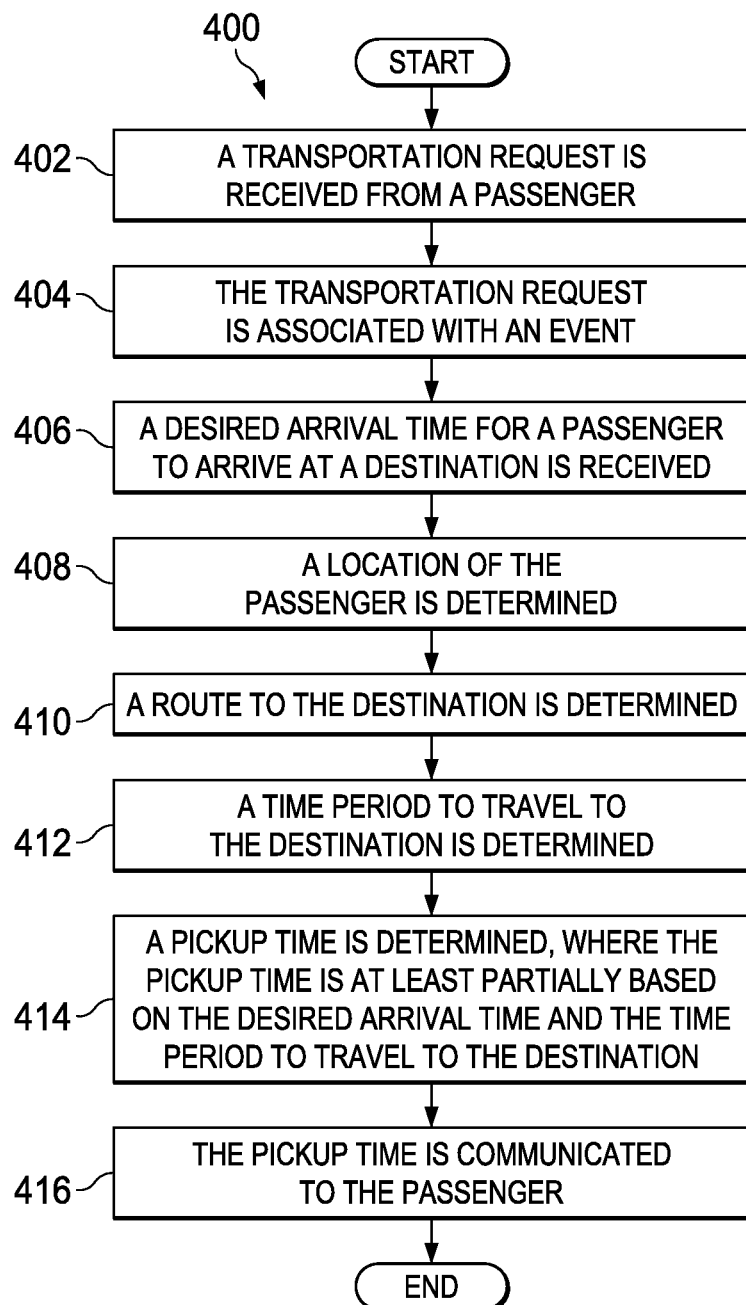
FIG. 4 is an example flowchart illustrating possible operations of a flow that may be associated with determining a pickup time in accordance with certain embodiments.

FIG. 4 is an example flowchart illustrating possible operations of a flow 400 that may be associated with determining a pickup time, in accordance with an embodiment. In an embodiment, one or more operations of flow 400 may be performed by one or more of backend server 302 or passenger application logic 218.

At 402, a transportation request is received from a passenger. At 404, the transportation request is associated with an event. At 406, a desired arrival time for a passenger to arrive at a destination is received. In various embodiments, the desired arrival time is based on the start time of the event and the destination is the location of the event. At 408, a location of the passenger is determined. In various embodiments, the location may be a location preconfigured by the passenger (e.g., a home or residence of the passenger, a workplace of the passenger, a specific location the passenger would like to be picked up, etc.) or the location may be a dynamic location of the passenger (e.g., as measured by GPS 210). At 410, a route to the destination is determined. At 412, a time period to travel to the destination is determined based on the route. At 414, a pickup time is determined, where the pickup time is at least partially based on the desired arrival time and the time period to travel to the destination. At 416, the pickup time is communicated to the passenger. In an example, the pickup time can be determined by the distance between the pickup location and the destination, the estimated traffic during the travel time to the destination, the forecasted weather (e.g., rain or snow typically causes an increase in travel time), whether there is any construction along the route, or other factors that can affect the travel time from the pickup location to the destination. For example, if the desired arrival time is 7:00 pm and it takes an average of 1 hour to travel from the pickup location to the destination the pickup time may be 6:00 pm. However, if the expected travel time increases due to rush hour traffic or inclement weather, the pickup time can be set to an earlier time.

Some of the steps illustrated in FIG. 4 may be repeated, combined, modified or deleted where appropriate, and additional steps may also be included. Additionally, steps may be performed in any suitable order or concurrently without departing from the scope of particular embodiments.

Figure 5:
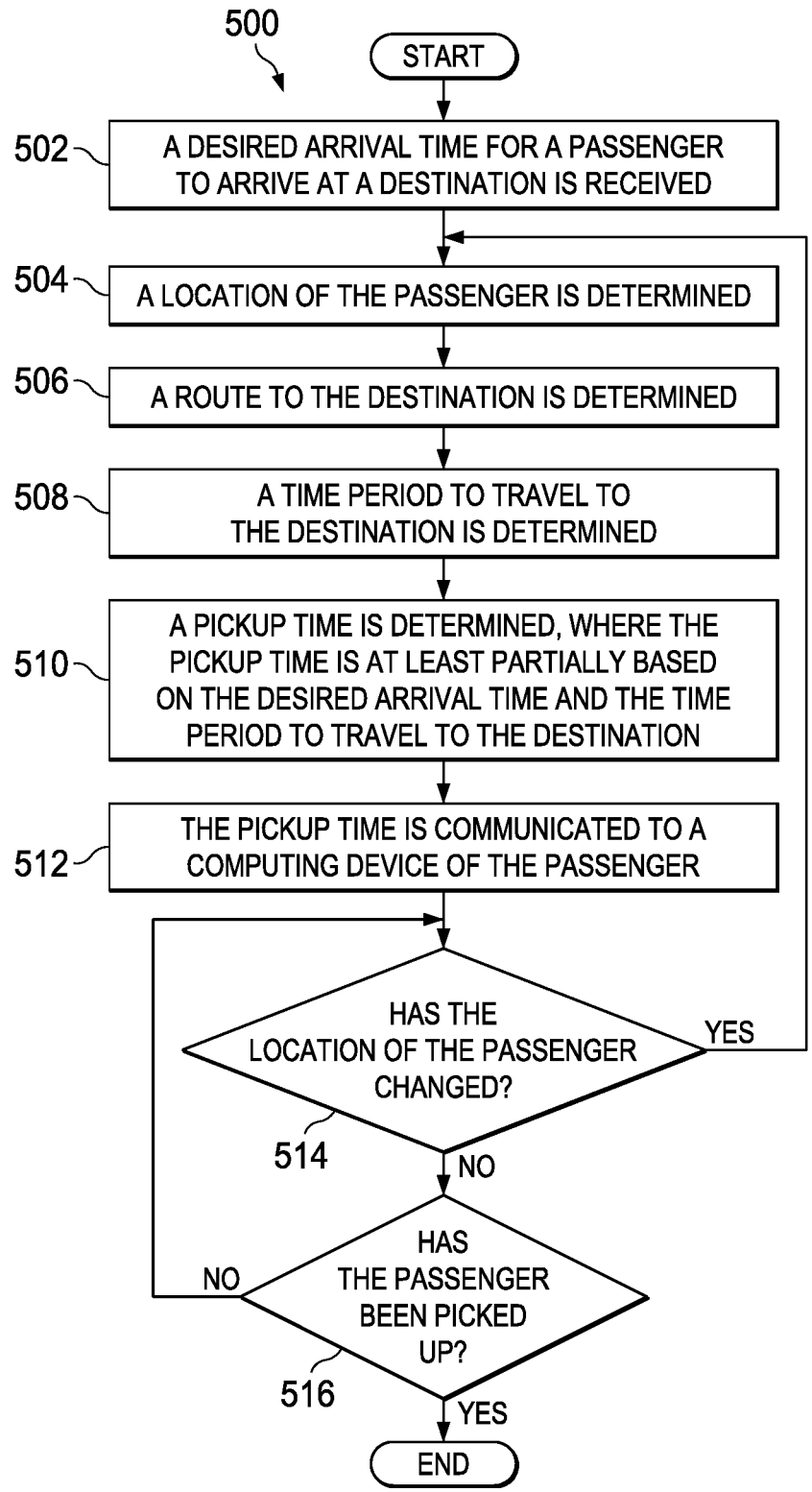
FIG. 5 is an example flowchart illustrating possible operations of a flow that may be associated with determining a pickup time in accordance with certain embodiments.

FIG. 5 is an example flowchart illustrating possible operations of a flow 500 that may be associated with determining a pickup time, in accordance with an embodiment. In an embodiment, one or more operations of flow 500 may be performed by one or more of backend server 302 or passenger application logic 218. In various embodiments, operations of the flow may occur in conjunction with an event being associated with a transportation request.

At 502, a desired arrival time for a passenger to arrive at a destination is received. At 504, a location of the passenger is determined. At 506, a route to the destination is determined. At 508, a time period to travel to the destination is determined. At 510, a pickup time is determined, where the pickup time is at least partially based on the desired arrival time and the time period to travel to the destination. At 512, the pickup time is communicated to a computing device of the passenger. At 514, the system determines if the location of the passenger has changed. If the location of the passenger has changed, then a (new) location of the passenger is determined, as in 504. If the location has not changed, then the system determines if the passenger has been picked up, as in 516. If the passenger has not been picked up, then the system determines if the location of the passenger has changed, as in 514. If the passenger has been picked up, then the process ends.

Some of the steps illustrated in FIG. 5 may be repeated, combined, modified or deleted where appropriate, and additional steps may also be included. Additionally, steps may be performed in any suitable order or concurrently without departing from the scope of particular embodiments.

Figure 6:
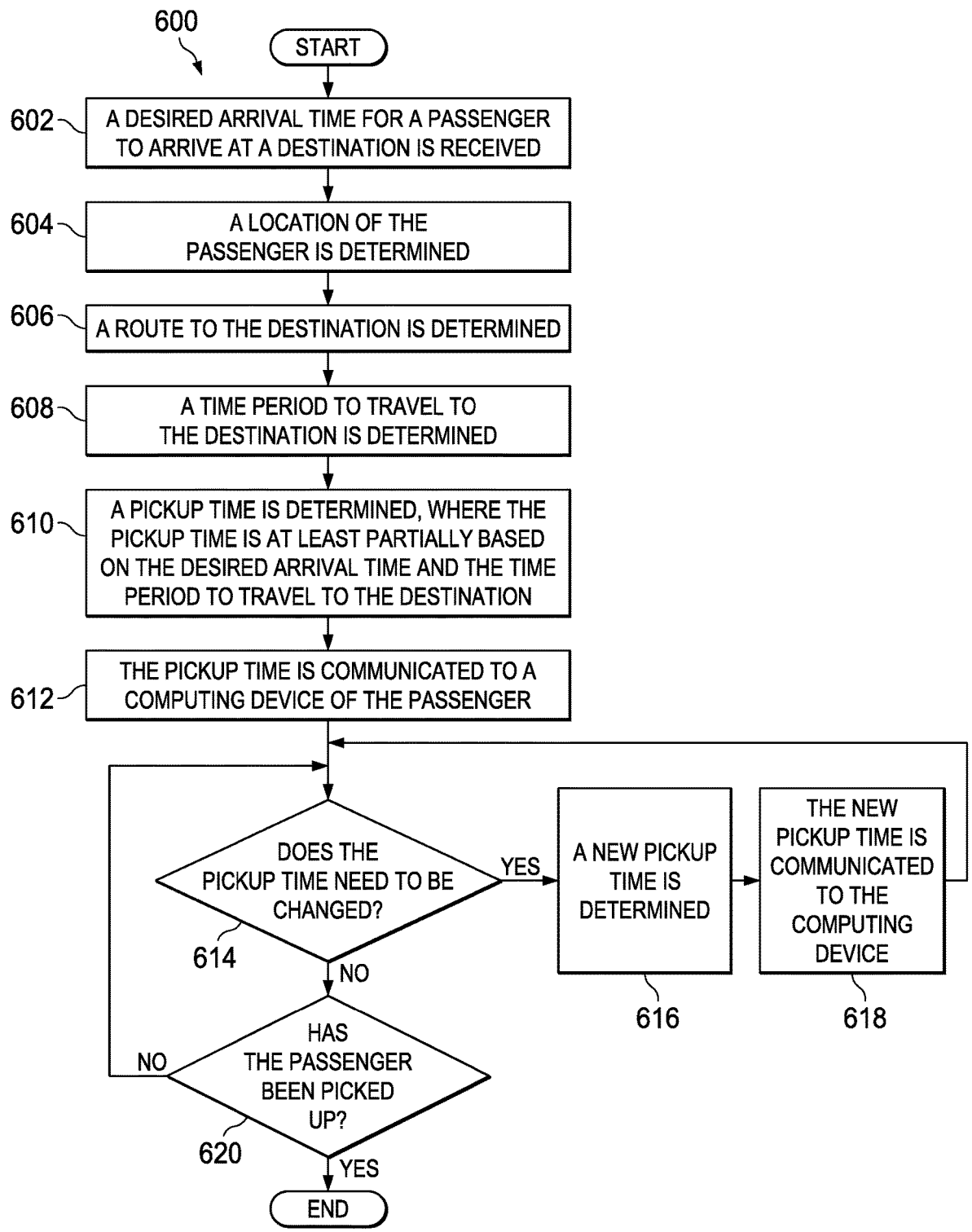
FIG. 6 is an example flowchart illustrating possible operations of a flow that may be associated with determining a pickup time in accordance with certain embodiments.

FIG. 6 is an example flowchart illustrating possible operations of a flow 600 that may be associated with determining a pickup time, in accordance with an embodiment. In an embodiment, one or more operations of flow 600 may be performed by one or more of backend server 302 or passenger application logic 218. In various embodiments, operations of the flow may occur in conjunction with an event being associated with a transportation request.

At 602, a desired arrival time for a passenger to arrive at a destination is received. At 604, a location of the passenger is determined. At 606, a route to the destination is determined. At 608, a time period to travel to the destination is determined. At 610, a pickup time is determined, where the pickup time is at least partially based on the desired arrival time and the time period to travel to the destination. At 612, the pickup time is communicated to a computing device of the passenger. At 614, the system determines if the pickup time needs to be changed. If the pickup time needs to be changed (e.g., in response to a determination that the start time of the event has changed), then a new pickup time is determined, as in 616. At 618, the new pickup time is communicated to the computing device. If the pickup time has not changed, then the system determines if the passenger has been picked up, as in 620. If the passenger has not been picked up, then the system determines if the pickup time needs to be changed, as in 614. If the passenger has been picked up, then the process ends.

Some of the steps illustrated in FIG. 6 may be repeated, combined, modified or deleted where appropriate, and additional steps may also be included. Additionally, steps may be performed in any suitable order or concurrently without departing from the scope of particular embodiments.

It is also important to note that the steps in FIGS. 4-6 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger computing devices 104 or driver computing devices 108 where appropriate. Similarly, certain functionality described herein as being performed by a passenger computing device 104 or a driver computing device 108 may, in various embodiments, be performed by backend server 116 where appropriate.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving, at one or more servers, from a passenger computing device associated with a passenger of a transportation system, a transportation request indicating a pickup location and a destination location;
   determining, via the one or more servers, that the transportation request corresponds to an event comprising an event location and an event start time;
   in response to determining that the transportation request corresponds to the event, determining a pickup time for the transportation request to allow the passenger to arrive at the event location by the event start time;
   selecting, via the one or more servers, from among a plurality of driver computing devices associated with the transportation system, a driver computing device associated with a driver to fulfill the transportation request to transport the passenger to the event location by the event start time;
   receiving, from the passenger computing device, an updated transportation request indicating a modified pickup time;
   releasing the selected driver based on the modified pickup time; and
   selecting a new driver computing device from among the plurality of driver computing devices to fulfill the transportation request to transport the passenger to the event location by the event start time.

2. The method of claim 1, wherein determining that the transportation request corresponds to the event comprises identifying event information for the event within the transportation request.

3. The method of claim 1, wherein determining that the transportation request corresponds to the event comprises:
   identifying event information within a calendar file associated with the passenger; and
   determining a likelihood that the passenger is going to attend the event based on the event information within the calendar file.

4. The method of claim 1, wherein determining that the transportation request corresponds to the event comprises:
   accessing previous transportation requests and historical location data associated with the passenger; and
   determining a likelihood that the passenger is going to attend the event based on the previous transportation requests and the historical location data.

5. The method of claim 1, wherein determining that the transportation request corresponds to the event comprises:
   accessing event information indicating the event location and the event start time; and
   comparing the event location with the destination location and the event start time with a pickup time associated with the transportation request.

6. The method of claim 1, further comprising temporarily limiting a number of transportation requests provided to the new driver computing device to ensure that the new driver computing device can fulfill the transportation request to transport the passenger to the event location by the event start time.

7. The method of claim 1, further comprising:
   determining, via the one or more servers, that the transportation request corresponds to the event comprising an event location and the event start time based on the destination location and a transportation request time of the transportation request from the passenger computing device.

8. A non-transitory computer readable medium comprising instructions that, when executed by at least one processor, cause a computing device to:
   receive, at one or more servers, from a passenger computing device associated with a passenger of a transportation system, a transportation request indicating a pickup location and a destination location;
   determine, via the one or more servers, that the transportation request corresponds to an event comprising an event location and an event start time;
   in response to determining that the transportation request corresponds to the event, determine a pickup time for the transportation request to allow the passenger to arrive at the event location by the event start time;
   select, via the one or more servers, from among a plurality of driver computing devices associated with the transportation system, a driver computing device associated with a driver to fulfill the transportation request to transport the passenger to the event location by the event start time;
   receive, from the passenger computing device, an updated transportation request indicating a modified pickup time;
   release the selected driver based on the modified pickup time; and
   select a new driver computing device from among the plurality of driver computing devices to fulfill the transportation request to transport the passenger to the event location by the event start time.

9. The non-transitory computer readable medium of claim 8, further comprising instructions that, when executed by the at least one processor, cause the computing device to determine that the transportation request corresponds to the event by identifying event information for the event within the transportation request.

10. The non-transitory computer readable medium of claim 8, further comprising instructions that, when executed by the at least one processor, cause the computing device to determine that the transportation request corresponds to the event by:
    identifying event information within a calendar file associated with the passenger; and determining a likelihood that the passenger is going to attend the event based on the event information within the calendar file.

11. The non-transitory computer readable medium of claim 8, further comprising instructions that, when executed by the at least one processor, cause the computing device to determine that the transportation request corresponds to the event by:
accessing previous transportation requests and historical location data associated with the passenger; and
determining a likelihood that the passenger is going to attend the event based on the previous transportation requests and the historical location data.

12. The non-transitory computer readable medium of claim 8, further comprising instructions that, when executed by the at least one processor, cause the computing device to determine that the transportation request corresponds to the event by:
accessing event information indicating the event location and the event start time; and
comparing the event location with the destination location and the event start time with a pickup time associated with the transportation request.

13. The non-transitory computer readable medium of claim 8, further comprising instructions that, when executed by the at least one processor, cause the computing device to temporarily limit a number of transportation requests provided to the new driver computing device to ensure that the new driver computing device can fulfill the transportation request to transport the passenger to the event location by the event start time.

14. The non-transitory computer readable medium of claim 8, further comprising instructions that, when executed by the at least one processor, cause the computing device to:
determine, via the one or more servers, that the transportation request corresponds to the event comprising the event location and the event start time based on the destination location and a transportation request time of the transportation request from the passenger computing device.

15. A system comprising:
at least one processor; and
a non-transitory computer readable medium comprising instructions that, when executed by the at least one processor, cause the system to:
receive, at one or more servers, from a passenger computing device associated with a passenger of a transportation system, a transportation request indicating a pickup location and a destination location;
determine, via the one or more servers, that the transportation request corresponds to an event comprising an event location and an event start time;
in response to determining that the transportation request corresponds to the event, determine a pickup time for the transportation request to allow the passenger to arrive at the event location by the event start time;
select, via the one or more servers, from among a plurality of driver computing devices associated with the transportation system, a driver computing device associated with a driver to fulfill the transportation request to transport the passenger to the event location by the event start time;
receive, from the passenger computing device, an updated transportation request indicating a modified pickup time;
release the selected driver based on the modified pickup time; and
select a new driver computing device from among the plurality of driver computing devices to fulfill the transportation request to transport the passenger to the event location by the event start time.

16. The system of claim 15, further comprising instructions that, when executed by the at least one processor, cause the system to determine that the transportation request corresponds to the event by identifying event information for the event within the transportation request.

17. The system of claim 15, further comprising instructions that, when executed by the at least one processor, cause the system to determine that the transportation request corresponds to the event by:
identifying event information within a calendar file associated with the passenger; and determining a likelihood that the passenger is going to attend the event based on the event information within the calendar file.

18. The system of claim 15, further comprising instructions that, when executed by the at least one processor, cause the system to determine that the transportation request corresponds to the event by:
accessing previous transportation requests and historical location data associated with the passenger; and
determining a likelihood that the passenger is going to attend the event based on the previous transportation requests and the historical location data.

19. The system of claim 15, further comprising instructions that, when executed by the at least one processor, cause the system to determine that the transportation request corresponds to the event by:
accessing event information indicating the event location and the event start time; and
comparing the event location with the destination location and the event start time with a pickup time associated with the transportation request.

20. The system of claim 15, further comprising instructions that, when executed by the at least one processor, cause the system to temporarily limit a number of transportation requests provided to the new driver computing device to ensure that the new driver computing device can fulfill the transportation request to transport the passenger to the event location by the event start time.

* * * * *